Dec. 4, 1956 M. G. HANDSCHIN 2,773,124

METHOD AND DEVICE FOR CONTROLLING A TELEPHONOGRAPH

Filed Dec. 31, 1951

INVENTOR:
M. G. Handschin
By Bryant & Lowry
Attys

United States Patent Office 2,773,124

Patented Dec. 4, 1956

2,773,124

METHOD AND DEVICE FOR CONTROLLING A TELEPHONOGRAPH

Max G. Handschin, Kusnacht, near Zurich, Switzerland, assignor to Promundo, Schaan, Liechtenstein, a firm Application December 31, 1951, Serial No. 264,317

5 Claims. (Cl. 179—6)

In the case of telephonographs which are already known, the reproduction of a communication or the repetition of a part of a message which was not properly understood can be obtained by speaking into the telephonograph, over the telephone line, speech impulses of a definite frequency. It is, however, a disadvantage of this method of control that the caller must listen to the complete message before the receiving apparatus is changed over. This may cause a considerable loss of time. With the known method initiating a repetition by means of vowels there is also the possibility that a vowel recorded on the sound carrier may bring about an unintentional reptition. If during the recording of the message a single vowel was pronounced, which was really intended to initiate a repetition, this will also bring about an unintentional repetition, which is repeated again and again, because the sound carrier cannot get beyond that point where this vowel is recorded. Control by vowels had also the disadvantage that their pronunciation is somewhat difficult in several languages, and also when the caller has a cold.

Several devices have already become known, which have been tried to remove these defects. For instance, a bridge connection with damping devices was provided for this purpose. However, this well-known method postulates a balance accurate to at least 50Ω with the telephone line. This can be carried out only for one telephone connection. If the telephone line is disconnected before the end of the message, this device fails completely, because the balance of the bridging connection is disturbed.

The present method for the control of telephonographs is designed to eliminate all these defects by making it possible that the initiation of a repetition can also take place while the replying device is functioning.

The apparatus designed to carry out the method in accordance with this invention is provided at the input side of the telephonograph with a repeating coil which is connected on the primary side to the exchange line and which is provided with two secondary windings. Of the two secondary windings the first is connected through a first electronic valve amplifier to a coding apparatus, and the second winding through a second electronic valve amplifier to the two speaking heads. Between the two electronic valve amplifiers is a phase-reversing device connected so that the signal voltages originating in the speaking heads are sent by the second electronic valve amplifier partly through the phase-reverser and partly through the two secondary windings of the repeater coil to the first electronic valve amplifier, phases and amplitudes being in such a condition that the signal voltage is neutralised in the first amplifier, while it amplifies and sends out signal voltages coming from the exchange line.

The attached drawing shows an example of a device on the lines of the present invention.

Figure 1:
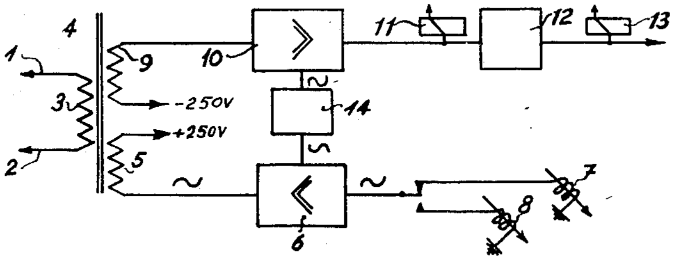

Fig. 1 indicates the general principle, and

Figure 2:
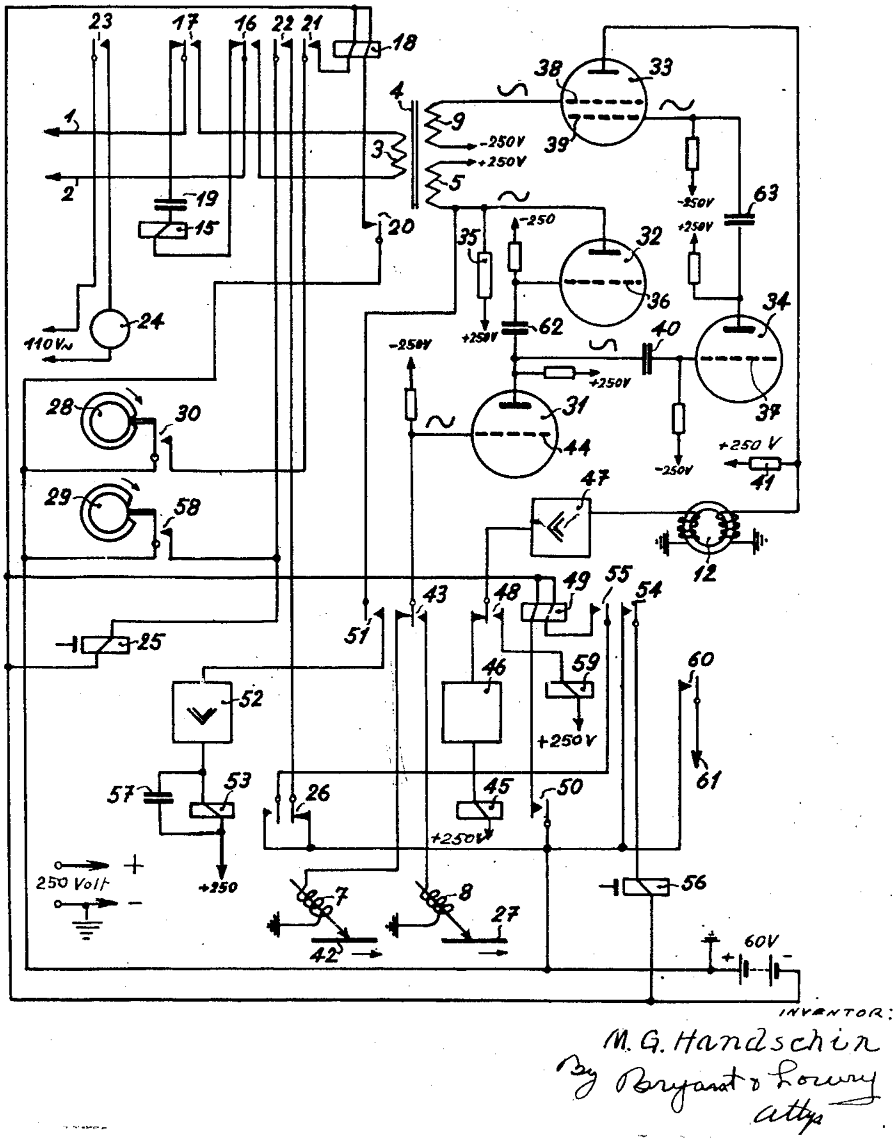

Fig. 2 is a wiring diagram.

In Fig. 1 a telephone line 1, 2 is connected to the winding 3 of a repeater 4 in a telephonograph. A secondary winding 5 of repeater 4 is connected through an amplifier 6 with one of the two speaking heads 7 and 8. Another secondary winding 9 is connected through an amplifier 10 directly to relay 11 or through a filter 12 to a relay 13. Between the two amplifiers 6 and 10 a phase-reversing device 14 is connected. The signal voltage from speaking head 7 or 8 is amplified in amplifier 6 and gets through windings 5 and 3 of repeater 4 to the telephone line 1, 2 and at the same time through the windings 5 and 9 to the input side of amplifier 10. In accordance with this invention, amplifier 10 receives now from the phase reverser 14 another voltage identical with that due to the signal, but with a phase displacement of 180°. It is easy to see that the voltages arriving in amplifier 10 from the speaking heads through repeater 4 and from the phase reversing device neutralise each other in this manner in the amplifier so that they do not get to relay 11 or filter 12. The phase relationships during this process are indicated in Fig. 1 by wavy lines. Consequently, the described device prevents that a signal voltage originating in one of the speaking heads initiates an unintentional repetition. On the other hand, the caller can actuate the coding device even when the machine is running and reproducing a message.

Fig. 2 shows a part of the circuit diagram of a fully automatic telephonogram as far as this is necessary to explain the invention. In this diagram the working principle explained in Fig. 1 is applied. Identical parts in the two figures are indicated by the same numbers. By a ringing current from any subscriber of the telephone wire system a relay 15 is excited through the contacts 16 and 17 of a relay 18 and through a condenser 19. Relay 15 closes its contact 20, so that also relay 18 is excited through earth, contact 20, operating winding of relay 18 and a 60 v. battery. Motor 24 drives in a well-known manner, through reduction gearing with a high ratio, a sound carrier 27 and two cams 28 and 29 in the direction indicated by an arrow. Cam 28 closes immediately its switch 30 so that relay 18 is held through the switches 21 and 30 and its holding winding. The exchange line 1, 2 is connected to the primary winding 3 of repeater 4, and held in this position, by contact 17 of relay 18.

Before continuing with the description of the device, we shall explain the function of the four electronic valves 31 to 34 and of a load resistance. The signal voltage, which comes from the two speaking heads 7 and 8, is amplified by electronic valve 31 and gets through condensers 40 and 62 to the control grids of the electronic valves 32 and 34. Valve 32 is a power valve which transmits the signal through repeater 4 to the exchange line 1, 2. For the transmission of the signal the latter should receive a maximum power of 0.002 watts. But valve 32, as a normal end pentode, has an output of about 4 watts. It is now provided with the load resistance 35 so that load changes coming from the exchange line 1, 2 and from the repeater 4 have no noticeable influence on the amplitude of the output voltage of electronic valve 32. It follows, that also the signal voltage, amplified by electronic valve 32, which gets through the repeater 4 to the controlling grid 38 of the electronic valve 33, is not influenced by the load changes mentioned above. Electronic valve 34 also delivers a signal voltage through condenser 63 to the second controlling grid 39 of electronic valve 33 which has the same amplitude as the signal voltage amplified in electronic valve 31 but has a phase displacement of 180° with respect to the latter, so that these two signal voltages are neutralised in electronic valve 33. The signal voltage of electronic valve 34 is here maintained because its controlling grid 37 is coupled through a condenser 40 to the anode of electronic valve 31. This description shows that a signal voltage originating in one of the two speaking heads 7 and 8 cannot get into the anode circuit of electronic valve 33, so that it cannot get to relay 41 or to filter 12. An unintentional initiation of a repetition by speech impulses from the two speaking heads 7 and 8 is therefore quite excluded. But a signal voltage (tones, speech etc.) coming from the exchange line 1, 2 gets through repeater 4 to the controlling grid 38 of electronic valve 33, is amplified here and transmitted to relay 41 or to filter 12 because it is not neutralised in electronic valve 34 by a corresponding countervoltage.

If any subscriber of the telephone wire system has started the telephonograph as described above, he will now hear in the usual manner the text of the replying mechanism which is recorded on a sound carrier 42, through the following circuit: earth, speaking head 7, switch 43, controlling grid 44 of electronic valve 31, anode circuit of this valve, windings 5 and 3 of repeater 4, exchange line 1, 2. As already mentioned, this text will also get to the two controlling grids 38, 39 of electronic valve 33, but with a phase displacement of 180°, so that it has no further effect. Now the caller can speak into the telephonograph the words, numbers, etc. in accordance with the code for the initiation of a repetition, so that relay 41 and filter 12 receive the corresponding signal voltages and, if the code was pronounced correctly, a relay 45 will be excited through a coding device 46, which is already known, but not described here. From filter 12 the corresponding circuit leads to an amplifier 47, a switch 48, to coding device 46, and to relay 45. Excitation of relay 45 will cause a relay 49 to be excited through contact 50 of relay 45. Relay 49 now uses its contact 43 to switch off speaking head 7, of the replying device and to switch on speaking head 8, so that the latter is now connected to the exchange line. This completes the sequence for starting a reproduction. Also, an impulse amplifier 52 is connected to the repeater 4 through contact 51 of relay 49. It is the function of the impulse amplifier to watch the signals from speaking head 8 by means of a relay 53. A coupling magnet 56 is excited through contact 54 of relay 49, which is held above contact 55, so that the sound carrier 27 is set in motion in the direction indicated by the arrow. Relay 53 is excited by the signal impulses. It has a high release delay on account of a condenser 57 connected in series with the relay. The electromagnetic coupling remains excited in spite of the separation of the contacts 26, until the contacts 58 of cam 29 are completely separated when the cam has completed its full revolution.

If the caller has not correctly understood a part of the text of the reproduction, he can, by pronouncing certain code words, excite during the reproduction a relay 59 through filter 12, the amplifier 47, and the contact 48, so that through its contact 60 a circuit is connected up, which in a well known manner causes the sound carrier 27 to reverse. If there are no more records on the sound carrier, relay 53 will release with some delay, and relay 49 will be dead. The replying device, i. e. its cams 28 and 29, run back into their starting positions. The electro-magnetic coupling is again excited through switch 26. As soon as contact 30 of cam 28 opens, relay 18 becomes dead and the exchange line 1, 2 is disconnected from the repeater 4.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In apparatus for controlling a telephonograph of the type having a recording device and a reproducing device for recording and reproducing messages over a telephone line, and a coding device connected to control said telephonograph in response to signals received over such a line during operation of said reproducing device; the improvement which comprises means for isolating said telephonograph from signals imposed on said line from its reproducing device, said isolating means comprising a repeater transformer having a primary winding connected to said line and having first and second secondary windings, an amplifier connected from the first of said secondary windings to the input of said coding device, a second amplifier connected from the output of said reproducing device to said second secondary winding, and a phase reversing device connected between said amplifiers, whereby signals originating in said reproducing device are cancelled between said amplifiers while signals from said line are amplified and transmitted to said coding device.

2. Apparatus in accordance with claim 1, in which said first amplifier comprises a valve with two control grids, one being connected to said phase reversing device and the other to the first said secondary winding.

3. Apparatus in accordance with claim 1, in which said reproducing device includes a pair of reproducing heads, and in which said second amplifier comprises two grid-controlled electron valves, a change-over switch connecting the grid of one of said valves selectively to one of the reproducing heads, a condenser connecting the anode of said one valve to said phase reversing device, and a second condenser connecting the same anode to the grid of said other valve, the anode of the last-named valve being connected to said second secondary winding.

4. Apparatus in accordance with claim 3, in which said phase-reversing device comprises an electronic valve, said second condenser connecting the grid of the last-named valve to the anode of the first-named valve in said second amplifier, and a third condenser connected from the anode of the last-named valve to the grid of the valve of said first amplifier.

5. Apparatus in accordance with claim 4, including a load resistor connected in the anode circuit of the second electronic valve of said second amplifier, to stabilize the output voltage of said valve against variations due to varying loads from said line and said transformer.

References Cited in the file of this patent

UNITED STATES PATENTS

| | | |
|---|---|---|
| 2,171,366 | Hipple | Aug. 29, 1939 |
| 2,519,568 | Handschin | Aug. 22, 1950 |
| 2,537,407 | Handschin et al. | Jan. 9, 1951 |